(12) United States Patent
Zhu

(10) Patent No.: US 8,190,408 B2
(45) Date of Patent: May 29, 2012

(54) METHODS AND SYSTEMS FOR NUMERICALLY PREDICTING SURFACE IMPERFECTIONS ON STAMPED SHEET METAL PARTS

(75) Inventor: Xinhai Zhu, Pleasanton, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 333 days.

(21) Appl. No.: 12/729,099

(22) Filed: Mar. 22, 2010

(65) Prior Publication Data

US 2011/0231163 A1  Sep. 22, 2011

(51) Int. Cl.
   *G06F 17/10* (2006.01)
(52) U.S. Cl. ........ 703/2; 703/1; 703/7; 700/98; 700/150
(58) Field of Classification Search .................. 703/1, 2, 703/6, 7; 700/98, 117, 118, 145, 150; 706/21; 345/419
   See application file for complete search history.

(56) References Cited

U.S. PATENT DOCUMENTS

| | | | | |
|---|---|---|---|---|
| 5,301,811 A | * | 4/1994 | Mueller | 209/44.2 |
| 5,316,653 A | * | 5/1994 | Wu et al. | 205/245 |
| 6,785,640 B1 | * | 8/2004 | Lu et al. | 703/7 |
| 7,440,879 B2 | * | 10/2008 | Breitfeld et al. | 703/6 |
| 7,542,889 B2 | * | 6/2009 | Hillmann et al. | 703/6 |
| 2006/0041448 A1 | * | 2/2006 | Patterson et al. | 705/1 |
| 2009/0271156 A1 | * | 10/2009 | Kageura | 703/1 |

FOREIGN PATENT DOCUMENTS

WO   WO2004071350   8/2004

OTHER PUBLICATIONS

Germain et al, A Rigid-Viscoplastic Finite Element Program for Sheet Metal Forming Analysis, International Journal of Mechanical Science, vol. 31, No. 1, pp. 1-24, 1989.*
EPO Extended Search Report for Application Ser. No. 11158250.8-2224, May 24, 2011.
Del Pozo D. et al. "Prediction of press/die deformation for an accurate manufacturing of drawing dies" The International Journal of Advanced Manufacturing Technology, Springer, Berlin, DE, vol. 37, No. 7-8, Mar. 28, 2007, pp. 649-656 XP019619668, ISSN: 1433-3015.
Deng W J et al. "Formation of Ultra-Fine Grained Materials by Machining and the Characteristics of the Deformation Fields", Journal of Materials Processing Technology, Elsevier, NL, vol. 209, No. 9, May 1, 2009, pp. 4521-4526, XP026048555, ISSN: 0924-0136.
Wan M et al. "Efficient Algorithms for Calculations of Static Form Errors in Peripheral Milling", Journal of Materials Processing Technology, Elsevier, NL, vol. 171, No. 1, Jan. 10, 2006, pp. 156-165, XP025081192, ISSN: 0924-0136.

* cited by examiner

*Primary Examiner* — Russell Frejd
(74) *Attorney, Agent, or Firm* — Roger H. Chu

(57) ABSTRACT

Methods and systems for numerically predicting surface imperfections on stamped sheet metal parts are disclosed. FEM mesh includes a plurality of shell elements and a plurality of nodes that represents a stamped sheet metal part. At least one surface of the part needs to be examined for imperfection, which can be used for adjusting the die for forming the sheet metal part. Each surface is created by fitting all of nodes of a portion of the FEM mesh in a group-to-group scheme. A group is defined to include a center element and its neighbors. Neighbor elements share a side with the center element are always included in the group. Each group includes at least three neighbors in additional to the center element. Node-sharing elements are added into the group such that the criterion of at least three neighbors is met.

15 Claims, 5 Drawing Sheets

METHODS AND SYSTEMS FOR NUMERICALLY PREDICTING SURFACE IMPERFECTIONS ON STAMPED SHEET METAL PARTS

FIELD OF THE INVENTION

The present invention generally relates to numerical simulation of stamped metal parts, more particularly to methods and systems for numerically predicting surface imperfections of an engineering part (e.g., components of car, airplane, etc.) created by sheet metal stamping.

BACKGROUND OF THE INVENTION

Computer aided engineering (CAE) has been used for supporting engineers in many tasks. For example, in a structure or product design procedure, CAE analysis, in particular finite element analysis (FEA) or finite element method (FEM), has often been employed to evaluate responses (e.g., stresses, displacements, etc.) under various loading conditions (e.g., static or dynamic).

FEA is a computerized method widely used in industry to simulate (i.e., model and solve) engineering problems relating to complex products or systems (e.g., cars, airplanes, etc.) such as three-dimensional non-linear structural design and analysis. FEA derives its name from the manner in which the geometry of the object under consideration is specified. The geometry is defined by elements and nodes referred to as FEM mesh. There are many types of elements, solid elements for volumes or continua, shell or plate elements for surfaces and beam or truss elements for one-dimensional structure objects.

To numerically simulate sheet metal forming or stamping process, a FEM mesh of shell elements is used for representing sheet metal (or blank) at the outset of a stamping operation. Blank is then formed or stamped into a part by hydraulically or mechanically pressing a punch through it into a die. After the part is formed including springback, certain areas of the part's surface may have imperfections (also referred to as surface low). A stoning operation is commonly performed to detect such imperfections. Manufacturers of the parts would like to eliminate such imperfections by altering the die. Physically adjusting or modifying a die is also expensive both in terms of time and money.

It would, therefore, be desirable to have method and system that can be used for predicting surface imperfections numerically such that expensive die modifications can be minimized.

BRIEF SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Methods and systems for numerically predicting surface imperfections in stamped sheet metal parts are disclosed. According to one aspect of the present invention, a FEM mesh is configured for representing a stamped sheet metal part. The FEM mesh includes a plurality of shell elements and a plurality of nodes. At least one surface of the part needs to be examined for imperfections, which can be used for adjusting the die for forming the sheet metal part. Each surface is created by fitting all of nodes of a portion of the FEM mesh in a group-to-group scheme. A group is defined to include a center element and its neighbors. Neighbor elements sharing a side with the center element are always included in the group. Each group includes at least three neighbors in additional to the center element. When there are less than three side-sharing neighbors in the group, node-sharing elements are added into the group such that the criterion of at least three neighbors is met.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-4. However, those skilled in the art will readily appreciate that the detailed description given herein with respect to these figures is for explanatory purposes as the invention extends beyond these limited embodiments.

Figure 1A:
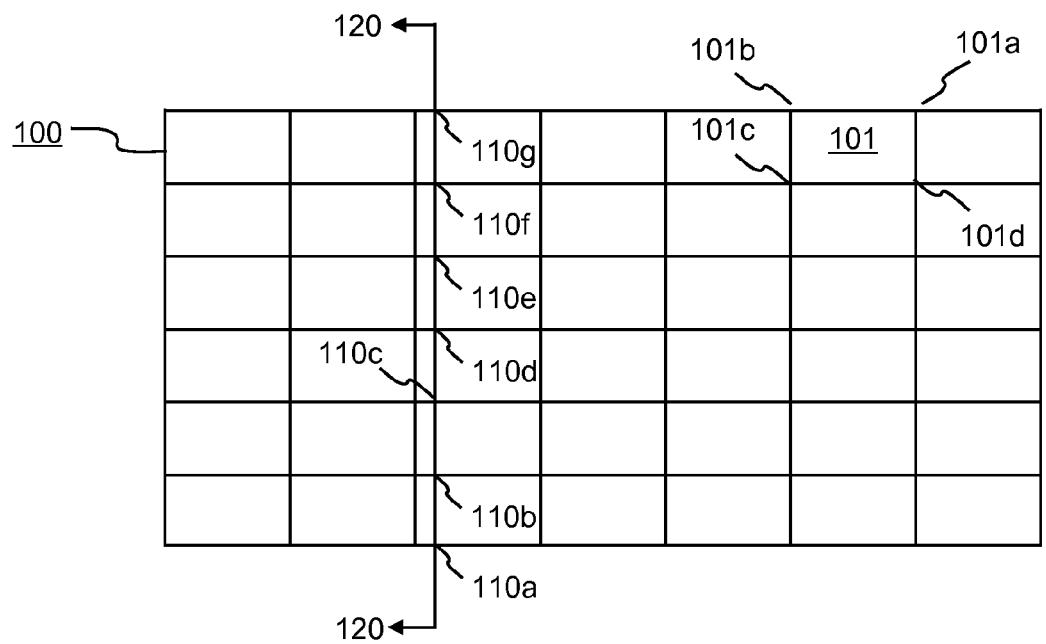
FIG. 1A is a two-dimensional view of an exemplary FEM mesh representing a surface of a stamped sheet metal part in accordance with one embodiment of the present invention.
Figure 1B:
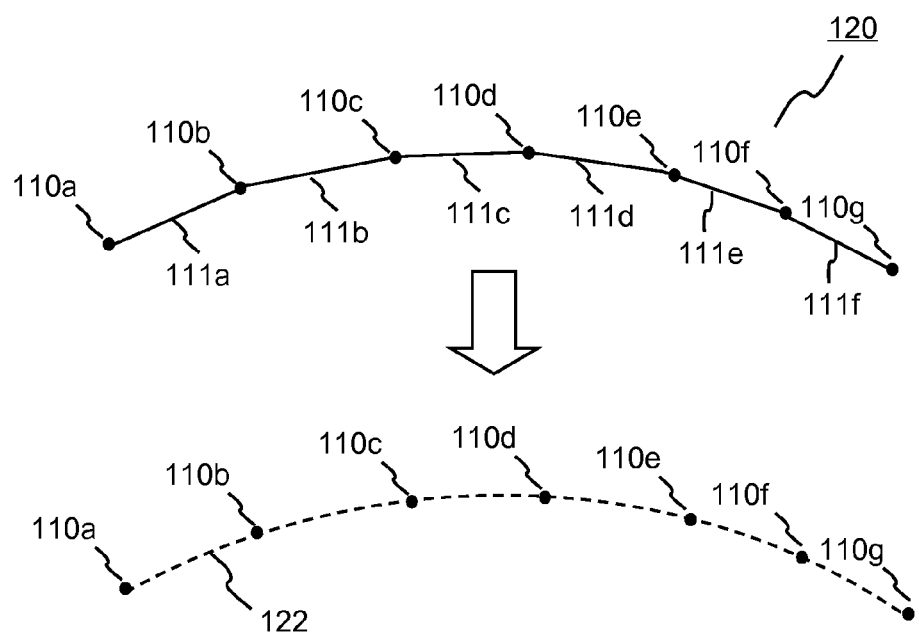
FIG. 1B is a diagram showing a cross-section of the FEM mesh of FIG. 1A.

Referring first to FIG. 1A, it is shown an exemplary FEM mesh 100 representing a portion of a stamped sheet metal part (e.g., door panel of a car). The FEM mesh 100 comprises a number of shell elements 101. Since the stamped sheet metal part is generally a non-flat surface, a cross-section 120 of the FEM mesh 100 is a curve. However, each shell element 101 in the FEM mesh 100 has a flat surface, so the cross-section 120 shown in FIG. 1B is not a smooth curve. The cross-section 120 contains multiple straight-line segments 111a-111f between points 110a-110g, which are the intersections at the element's edge. FEM results are calculated at nodal points of elements (e.g., nodes 101a-101d for element 101). In order to ensure that the cross-section 120 represents a smooth surface of the stamped sheet metal part, a smooth curve 122 is uniquely created from all of the nodal points 110a-110g. All nodal points 110a-110g are included in the smooth curve 122.

Figure 1C:
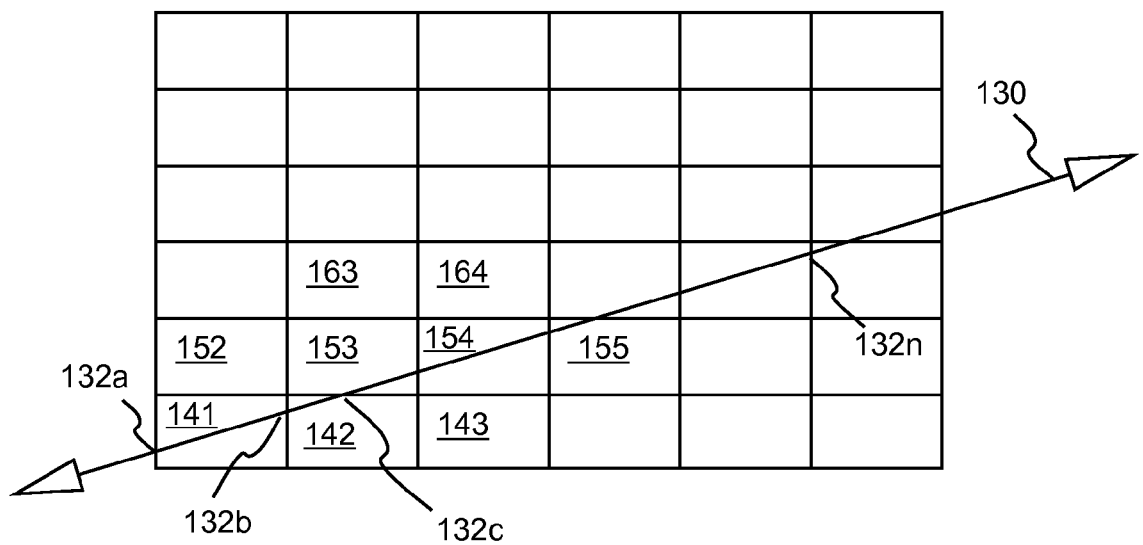
FIG. 1C is a two-dimensional view of the FEM mesh of FIG. 1A along with a stoning direction for checking surface imperfection.

Infinite numbers of cross-sections can be cut through the FEM mesh 100. A particular direction 130 is shown as a slant line over the FEM mesh 100. The particular direction 130, shown in FIG. 1C, is of interest, because it is the direction to check whether any surface imperfection exists. The direction 130 is the stoning direction in a metal stamping procedure. To use FEM mesh to numerically predict any surface imperfection, element edge intersections 132a-132n along direction 130 are used for creating a unique smooth curve (not shown but similar to curve 122). The unique smooth curve is then used to determine whether there is any surface imperfection.

To uniquely create a smooth curve from a plurality of element edge intersection points 132a-132n, a systemic approach based on at least three neighboring elements is used. For example, points 132a and 132b intersect edges of element 141. To create a smooth surface, three neighboring elements 142, 152 and 153 are included. Selections of neighboring elements are graphically shown in FIGS. 2A-2E. In other words, nodal points of elements 141, 142, 152 and 153 are used to create a surface (shown in FIG. 2C). Many well known procedures can be used to accomplish the curve fitting procedure, for example, B-spline, smooth patch, etc.

Figure 2A:
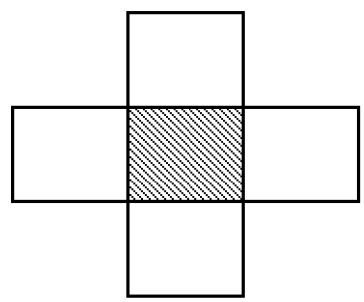
FIGS. 2A-2E are diagrams showing exemplary groups of neighbor elements used for creating a surface in accordance with one embodiment of the present invention.
Figure 2B:
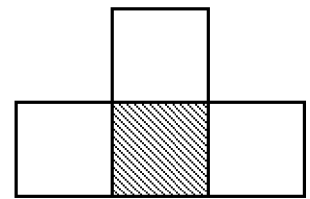
Figure 2C:
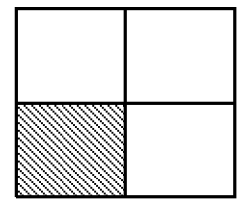

For element 142, the neighboring elements are 141, 143 and 153 as graphically shown in FIG. 2B. For element 153, FIG. 2A shows a scheme depicting how neighbors 142, 163, 152 and 154 are selected.

Figure 1D:
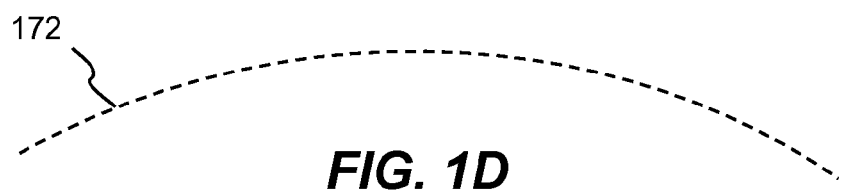
FIG. 1D shows a cross-section of the surface without imperfection in the stoning direction of FIG. 1C.
Figure 1E:
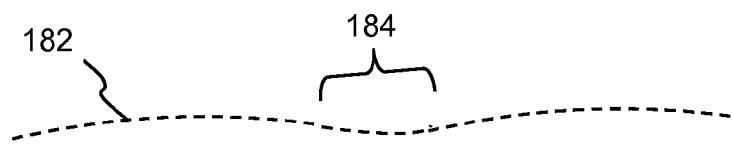
FIG. 1E shows a cross-section of the surface with imperfection in the stoning direction of FIG. 1C.

An exemplary smooth surface 172 without any surface imperfection is shown in FIG. 1D. In other words, a curved or rounded outward surface 172 is referred to as a convexed surface. FIG. 1E shows an exemplary concaved surface 182 with surface imperfection. Surface imperfection 184 is exaggerated for illustration.

For illustration simplicity, the FEM mesh 100 is shown with same sized quadrilateral elements neatly arranged in rows and columns. In reality, elements can be irregular in terms of their sizes and/or orientations and/or types (e.g., triangular elements). The present invention sets no limit as to what type, shape and/or orientation of elements in the FEM mesh.

Figure 2D:
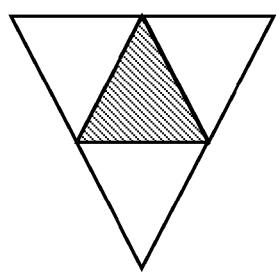
Figure 2E:
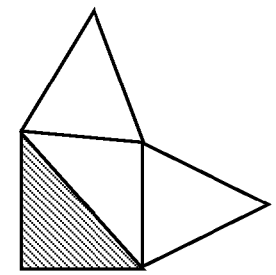

Whereas the FEM mesh 100 contains only quadrilateral elements, the present invention allows other types of shell elements (e.g., triangular elements). The neighbor selection schemes for triangular elements are shown in FIGS. 2D-2E.

Figure 3:
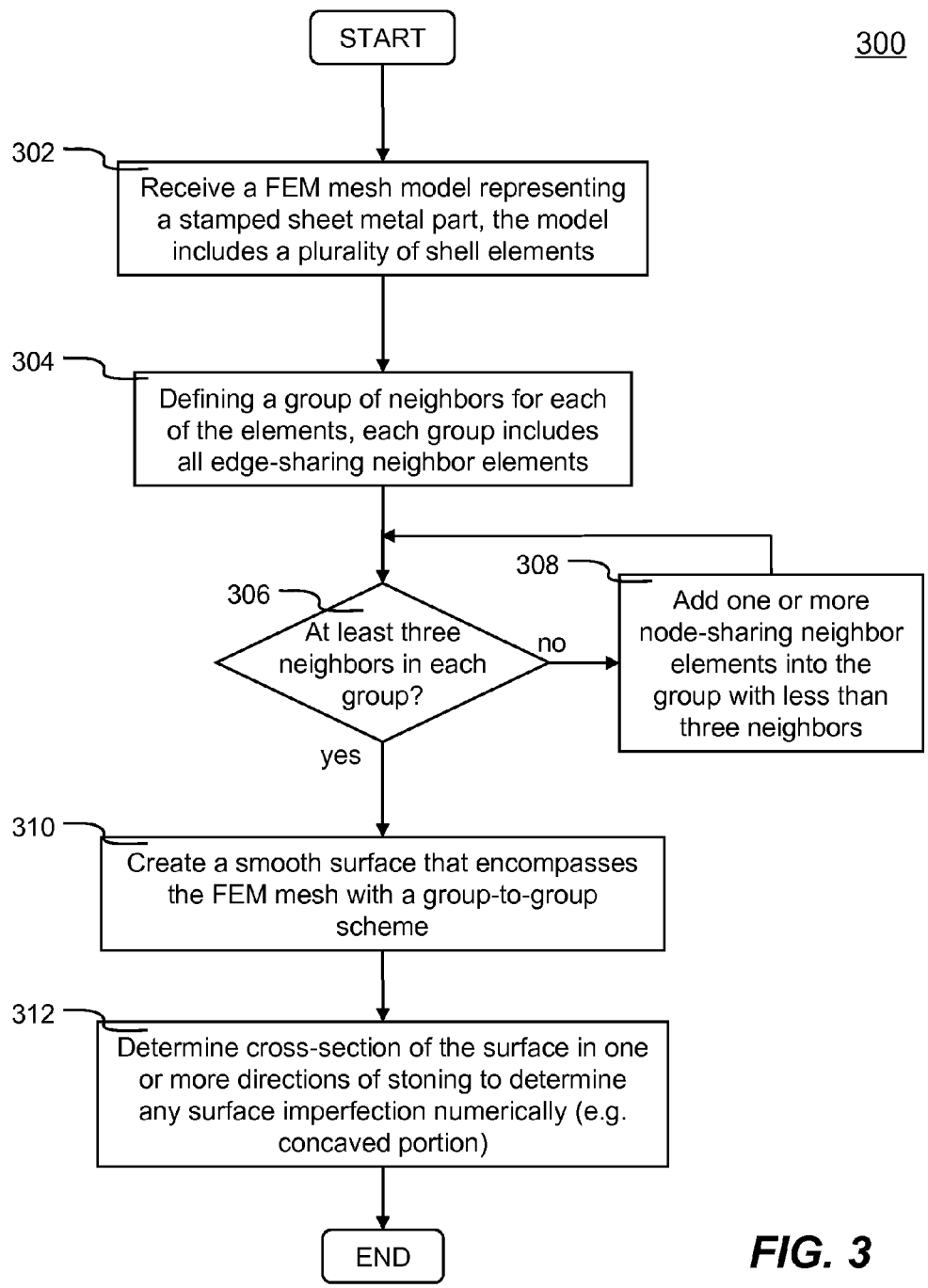
FIG. 3 is a flowchart illustrating an exemplary process of predicting surface imperfection of a stamped sheet metal part in accordance with one embodiment of the present invention.

FIG. 3 is a flowchart illustrating an exemplary process 300 of numerically predicting surface imperfection of a stamped sheet metal part using a FEM mesh in accordance with one embodiment of the present invention. Process 300 is preferably implemented in software.

Process 300 starts by receiving a FEM mesh model in a computer system at step 302. The FEM model represents a stamped sheet metal part. The model includes a plurality of nodes and a plurality of shell elements (e.g., quadrilateral and/or triangular elements). Next, at step 304, a group of neighboring elements is defined for each element (referred to as master or center element) in the FEM mesh model. In the initial definition, the group includes all side-sharing or edgy-sharing elements. In other words, each of the neighbors in the group shares one side or edge with the master element at this step. Then process 300 moves to decision 306 to check whether there are at least three neighbors in the group. If not, process 300 moves to step 308 to add one or more node-sharing neighboring elements into the groups with less than three neighbors. Otherwise, process 300 follows the "yes" branch of decision 306 to step 310 to create a smooth surface that encompasses all nodes of the elements in each group. The smooth surface is created in a group-to-group scheme. Adjustments are made between groups to ensure there is continuous curvature between groups. Once the smooth surface has been constructed or created, process 300 uses a cross-section in one or more directions of stoning to determine whether there is any surface imperfection at step 312. A surface imperfection or surface low can be defined as a concaved cross-section (e.g., a surface low 184 shown in FIG. 1E).

Figure 4:
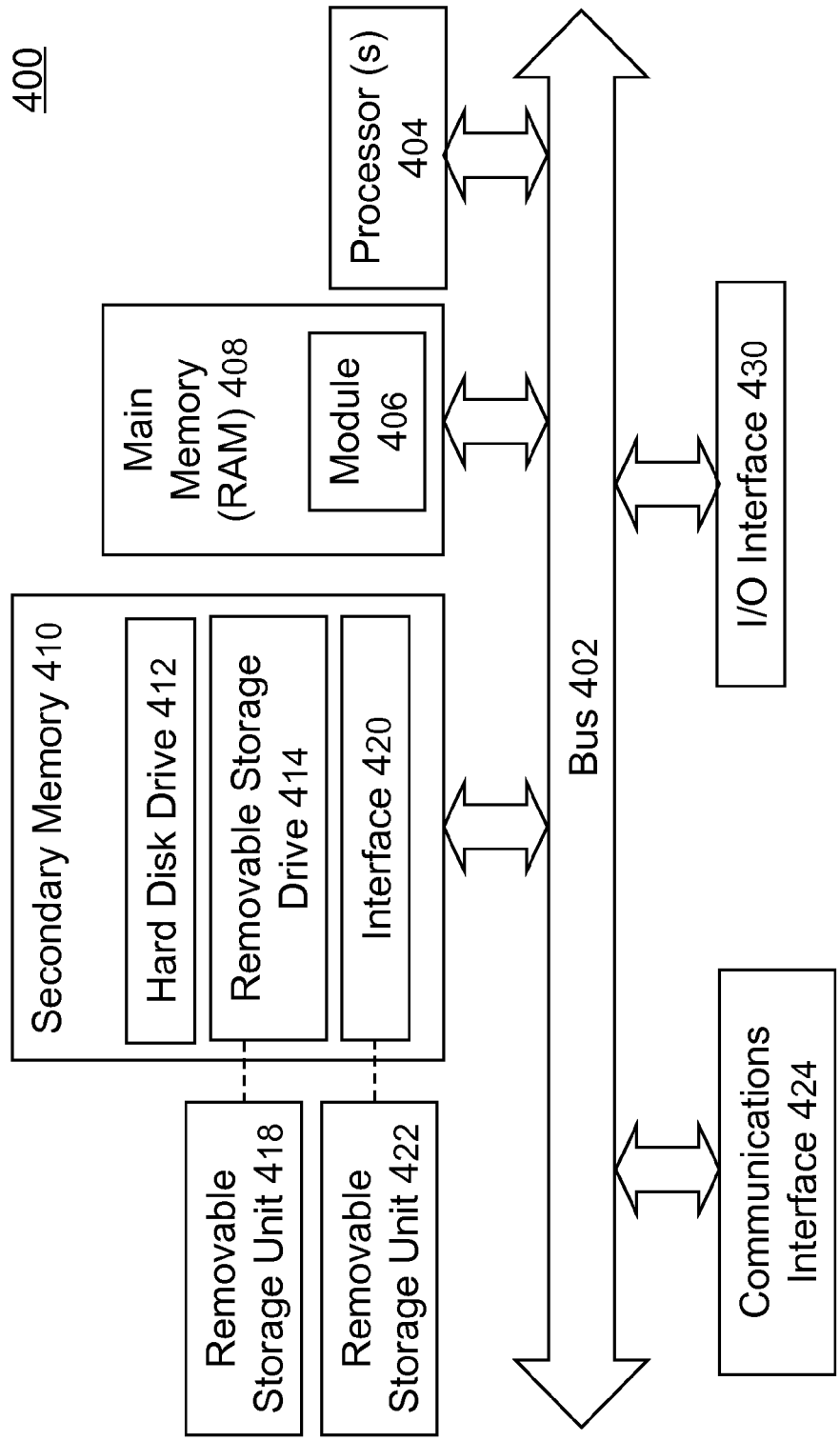
FIG. 4 is a function diagram showing salient components of a computing device, in which an embodiment of the present invention may be implemented.

According to one aspect, the present invention is directed towards one or more computer systems capable of carrying out the functionality described herein. An example of a computer system 400 is shown in FIG. 4. The computer system 400 includes one or more processors, such as processor 404. The processor 404 is connected to a computer system internal communication bus 402. Various software embodiments are described in terms of this exemplary computer system. After reading this description, it will become apparent to a person skilled in the relevant art(s) how to implement the invention using other computer systems and/or computer architectures.

Computer system 400 also includes a main memory 408, preferably random access memory (RAM), and may also include a secondary memory 410. The secondary memory 410 may include, for example, one or more hard disk drives 412 and/or one or more removable storage drives 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc. which is read by and written to by removable storage drive 414. As will be appreciated, the removable storage unit 418 includes a computer readable medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 422 and interfaces 420 which allow software and data to be transferred from the removable storage unit 422 to computer system 400. In general, Computer system 400 is controlled and coordinated by operating system (OS) software, which performs tasks such as process scheduling, memory management, networking and I/O services.

There may also be a communications interface 424 connecting to the bus 402. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc.

The computer 400 communicates with other computing devices over a data network based on a special set of rules (i.e., a protocol). One of the common protocols is TCP/IP (Transmission Control Protocol/Internet Protocol) commonly used in the Internet. In general, the communication interface 424 manages the assembling of a data file into smaller packets that are transmitted over the data network or reassembles received packets into the original data file. In addition, the communication interface 424 handles the address part of each packet so that it gets to the right destination or intercepts packets destined for the computer 400.

In this document, the terms "computer recordable storage medium", "computer recordable medium" and "computer readable medium" are used to generally refer to media such as removable storage drive 414, and/or a hard disk installed in hard disk drive 412. These computer program products are means for providing software to computer system 400. The invention is directed to such computer program products.

The computer system 400 may also include an input/output (I/O) interface 430, which provides the computer system 400 to access monitor, keyboard, mouse, printer, scanner, plotter, and alike.

Computer programs (also called computer control logic) are stored as application modules 406 in main memory 408 and/or secondary memory 410. Computer programs may also be received via communications interface 424. Such computer programs, when executed, enable the computer system 400 to perform the features of the present invention as discussed herein. In particular, the computer programs, when executed, enable the processor 404 to perform features of the present invention. Accordingly, such computer programs represent controllers of the computer system 400.

In an embodiment where the invention is implemented using software, the software may be stored in a computer program product and loaded into computer system 400 using removable storage drive 414, hard drive 412, or communications interface 424. The application module 406, when executed by the processor 404, causes the processor 404 to perform the functions of the invention as described herein.

The main memory 408 may be loaded with one or more application modules 406 that can be executed by one or more processors 404 with or without a user input through the I/O interface 430 to achieve desired tasks. In operation, when at least one processor 404 executes one of the application modules 406, the results are computed and stored in the secondary memory 410 (i.e., hard disk drive 412). The status of the time-marching engineering simulation (e.g., deformed beam element, deformed surface, and their relative position, etc.) is reported to the user via the I/O interface 430 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the global searching schemes are described and shown using bucket sorting algorithm, other equivalent techniques can be used to accomplish the same. Additionally, whereas the surface mesh has been shown to be a finite element mesh with a circular shape, other types of surface mesh can be used. Furthermore, the surface mesh has been shown in a two-dimensional for illustration simplicity, the surface mesh can be a surface of an arbitrary shaped three-dimensional object. In summary, the scope of the invention should not be restricted to the specific exemplary embodiments disclosed herein, and all modifications that are readily suggested to those of ordinary skill in the art should be included within the spirit and purview of this application and scope of the appended claims.

I claim:

1. A method of numerically predicting surface imperfection in a stoning operation of a stamped sheet metal part using a finite element method (FEM) mesh model comprising:
   receiving, in a computer system, a FEM mesh representing a stamped sheet metal part, the FEM mesh containing a plurality of nodes and a plurality of two-dimensional finite elements, wherein each of the two-dimensional finite elements are defined by corner nodes and edges between each adjacent pair of corner nodes;
   selecting a stoning direction with respect to the FEM mesh, the stoning direction corresponding to one of a stoning operation's directions;
   establishing a group of neighboring elements for each of the two-dimensional finite elements intersected by the stoning direction;
   creating a continuous smooth surface in a group-to-group scheme using the group of neighboring elements established earlier; and
   examining the continuous smooth surface's cross-section in the stoning direction to determine whether there is a surface imperfection, wherein the cross-section information is stored in a storage device and graphically displayed to a monitor upon a user's instruction.

2. The method of claim 1, said two-dimensional finite elements comprise quadrilateral shell elements.

3. The method of claim 1, said two-dimensional finite elements comprise quadrilateral triangular shell elements.

4. The method of claim 1, said establishing the group of neighboring elements further comprises including all edge-sharing neighbor elements for said each of the two-dimensional finite elements intersected by the stoning direction in the group initially.

5. The method of claim 4, further comprises adding one or more node-sharing neighbor elements into the group if the number of edge-sharing neighbor elements is less than three.

6. The method of claim 1, said creating the continuous smooth surface in a group-to-group scheme further comprises fitting a smooth surface to encompass corner nodes of all of the elements in each group.

7. The method of claim 6, further comprises performing a smoothing operation from one group to another.

8. The method of claim 1, wherein said surface imperfection is indicated by a concaved portion.

9. A system for numerically predicting surface imperfection in a stoning operation of a stamped sheet metal part using a finite element method (FEM) mesh model comprising:
   at least one processor operatively couple to a memory for storing computer readable code for an application module, said at least one processor executing the computer readable code in the memory to cause the application module to perform operations by a method of:

receiving a FEM mesh representing a stamped sheet metal part, the FEM mesh containing a plurality of nodes and a plurality of two-dimensional finite elements, wherein each of the two-dimensional finite elements are defined by corner nodes and edges between each adjacent pair of corner nodes;

selecting a stoning direction with respect to the FEM mesh, the stoning direction corresponding to one of a stoning operation's directions;

establishing a group of neighboring elements for each of the two-dimensional finite elements intersected by the stoning direction;

creating a continuous smooth surface in a group-to-group scheme using the group of neighboring elements established earlier; and examining the continuous smooth surface's cross-section in the stoning direction to determine whether there is a surface imperfection, wherein the cross-section information is stored in a storage device and graphically displayed to a monitor upon a user's instruction, the storage device and the monitor being operatively coupled to the at least one processor.

10. The system of claim 9, said establishing the group of neighboring elements further comprises including all edge-sharing neighbor elements for said each of the two-dimensional finite elements intersected by the stoning direction in the group initially.

11. The system of claim 10, further comprises adding one or more node-sharing neighbor elements into the group if the number of edge-sharing neighbor elements is less than three.

12. A non-transitory computer readable medium storing instructions for controlling a computer system for numerically predicting surface imperfection in a stoning operation of a stamped sheet metal part using a finite element method (FEM) mesh model by a method comprising:

at least one processor operatively couple to a memory for storing computer readable code for an application module, said at least one processor executing the computer readable code in the memory to cause the application module to perform operations by a method of:

receiving a FEM mesh representing a stamped sheet metal part, the FEM mesh containing a plurality of nodes and a plurality of two-dimensional finite elements, wherein each of the two-dimensional finite elements are defined by corner nodes and edges between each adjacent pair of corner nodes;

selecting a stoning direction with respect to the FEM mesh, the stoning direction corresponding to one of a stoning operation's directions;

establishing a group of neighboring elements for each of the two-dimensional finite elements intersected by the stoning direction;

creating a continuous smooth surface in a group-to-group scheme using the group of neighboring elements established earlier; and examining the continuous smooth surface's cross-section in the stoning direction to determine whether there is a surface imperfection, wherein the cross-section information is stored in a storage device and graphically displayed to a monitor upon a user's instruction, the storage device and the monitor being operatively coupled to the at least one processor.

13. The computer readable medium of claim 12, said establishing the group of neighboring elements further comprises including all edge-sharing neighbor elements for said each of the two-dimensional finite elements intersected by the stoning direction in the group initially.

14. The computer readable medium of claim 13, further comprises adding one or more node-sharing neighbor elements into the group if the number of edge-sharing neighbor elements is less than three.

15. The computer readable medium of claim 12, said creating the continuous smooth surface in a group-to-group scheme further comprises fitting a smooth surface to encompass corner nodes of all of the elements in each group.

* * * * *